United States Patent
Toda et al.

(10) Patent No.: US 9,933,551 B2
(45) Date of Patent: *Apr. 3, 2018

(54) DISPLAY AND INFORMATION-PRINTED MATTER

(71) Applicant: TOPPAN PRINTING CO., LTD., Tokyo (JP)

(72) Inventors: Toshiki Toda, Tokyo (JP); Akira Nagano, Tokyo (JP); Shingo Maruyama, Tokyo (JP); Seiko Matsuno, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 120 days.

This patent is subject to a terminal disclaimer.

(21) Appl. No.: 14/995,824

(22) Filed: Jan. 14, 2016

(65) Prior Publication Data

US 2016/0121641 A1    May 5, 2016

Related U.S. Application Data

(63) Continuation of application No. 12/592,523, filed on Nov. 25, 2009, which is a continuation of application No. PCT/JP2007/072134, filed on Nov. 14, 2007.

(30) Foreign Application Priority Data

May 25, 2007  (JP) .................................. 2007-138808
Jun. 8, 2007  (JP) .................................. 2007-152730

(51) Int. Cl.
*B32B 3/10*   (2006.01)
*G02B 5/18*   (2006.01)
(Continued)

(52) U.S. Cl.
CPC ............ *G02B 5/1819* (2013.01); *B41M 3/148* (2013.01); *B42D 25/29* (2014.10); *B42D 25/328* (2014.10);
(Continued)

(58) Field of Classification Search
None
See application file for complete search history.

(56) References Cited

U.S. PATENT DOCUMENTS 4,856,857 A    8/1989  Takeuchi et al.
5,135,812 A    8/1992  Phillips et al.
(Continued)

FOREIGN PATENT DOCUMENTS

CA    2 471 357       7/2003
CH      677905 A5     7/1991
(Continued)

OTHER PUBLICATIONS

International Search Report issued by the International Searching Authority (ISA/JP) dated Feb. 12, 2008 in connection with PCT/JP2007/072134.

(Continued)

*Primary Examiner* — Christopher Polley
(74) *Attorney, Agent, or Firm* — John P. White; Cooper & Dunham LLP

(57) ABSTRACT

A display includes a substrate with a light-transmitting property, a relief structure-forming layer disposed on at least one surface of the substrate and including a relief-structured region on a surface thereof opposite to its surface in contact with the substrate, a light-reflecting layer disposed on the surface of the relief structure-forming layer including the relief-structured region, and a printed layer formed on a surface of the substrate opposite to the surface on which the relief structure-forming layer is disposed, or between the (Continued)

relief structure-forming layer and the light-reflecting layer, or on a side of the light-reflecting layer opposite to its surface in contact with the relief structure-forming layer. The relief-structured region is constituted by recessed or protruding portions arranged two-dimensionally, has low reflectivity and low diffusibility under a normal illumination condition, and exhibits a diffracted light-emitting property under a specific condition.

9 Claims, 8 Drawing Sheets

(51) Int. Cl.
| | |
|---|---|
| B41M 3/14 | (2006.01) |
| G02B 27/42 | (2006.01) |
| G09F 3/02 | (2006.01) |
| G09F 3/03 | (2006.01) |
| B42D 25/29 | (2014.01) |
| B42D 25/328 | (2014.01) |

(52) U.S. Cl.
CPC ....... *G02B 5/1823* (2013.01); *G02B 27/4272* (2013.01); *G09F 3/02* (2013.01); *G09F 3/0376* (2013.01); *B42D 2033/20* (2013.01); *B42D 2035/20* (2013.01); *G02B 5/1814* (2013.01); *Y10T 428/24521* (2015.01)

(56) References Cited

U.S. PATENT DOCUMENTS

| | | | |
|---|---|---|---|
| 5,521,030 | A | 5/1996 | McGrew |
| 6,283,509 | B1 | 9/2001 | Braun et al. |
| 6,369,919 | B1 | 4/2002 | Drinkwater et al. |
| 2004/0179266 | A1 | 9/2004 | Schilling et al. |
| 2005/0104364 | A1 | 5/2005 | Keller et al. |
| 2007/0165182 | A1 | 7/2007 | Hoffmuller et al. |
| 2010/0080938 | A1 | 4/2010 | Toda et al. |

FOREIGN PATENT DOCUMENTS

| | | |
|---|---|---|
| DE | 19611383 A1 | 9/2007 |
| EP | 0 420 261 A2 | 4/1991 |
| EP | 0723501 B1 | 7/1996 |
| EP | 1 327 531 A1 | 7/2003 |
| EP | 1 584 647 A1 | 10/2005 |
| JP | 2-72320 | 3/1990 |
| JP | 7-108788 | 4/1995 |
| JP | 2004-4515 A | 1/2004 |
| JP | 2004-358925 | 12/2004 |
| JP | 2005-10230 A | 1/2005 |
| JP | 2005-10231 A | 1/2005 |
| JP | 2006-153990 | 6/2006 |
| JP | 2006-153990 A | 6/2006 |
| JP | 2006-171605 A | 6/2006 |
| JP | 2006-528369 A | 12/2006 |
| JP | 2007-069473 | 3/2007 |
| JP | 2007-072188 | 3/2007 |
| WO | WO 91/06925 | 5/1991 |
| WO | WO 92/16378 | 10/1992 |
| WO | WO 96/39307 | 12/1996 |
| WO | WO 01/03945 A1 | 1/2001 |
| WO | WO 03/033274 A1 | 4/2003 |
| WO | WO 2005/100096 A1 | 10/2005 |
| WO | WO 2005/105475 | 11/2005 |
| WO | WO 2005/106601 A2 | 11/2005 |
| WO | WO 2005/108108 A2 | 11/2005 |
| WO | WO 2006/046216 A2 | 5/2006 |

OTHER PUBLICATIONS

International Preliminary Report on Patentability issued by the International Bureau of WIPO (IB) dated Jan. 12, 2010 in connection with PCT/JP2007/072134.
Jan. 14, 2011 Official Action in connection with Canadian Patent Application No. 2,686,460.
European Search Report issued by the European Patent Office dated Jul. 16, 2012 in corresponding European Patent Application No. EP 07831864.
Communication of a notice of opposition dated Aug. 12, 2014 in connection with European Patent Application No. 07831864.9.
Cowan, Applications of Holography, Jan. 21-23, 1985, Polaroid Corporation, all pages.
Office Action dated Jul. 11, 2011 in connection with U.S. Appl. No. 12/592,523, filed Nov. 25, 2009.
Response to Jul. 11, 2011 Office Action, filed Oct. 11, 2011, in connection with U.S. Appl. No. 12/592,523, filed Nov. 25, 2009.
Final Office Action dated Jan. 6, 2012 in connection with U.S. Appl. No. 12/592,523, filed Nov. 25, 2009.
Response to Jan. 6, 2012 Final Office Action, filed Mar. 26, 2012, in connection with U.S. Appl. No. 12/592,523, filed Nov. 25, 2009.
Office Action dated Jun. 13, 2013 in connection with U.S. Appl. No. 12/592,523, filed Nov. 25, 2009.
Response to Jun. 13, 2013 Office Action, filed Sep. 13, 2013, in connection with U.S. Appl. No. 12/592,523, filed Nov. 25, 2009.
Final Office Action dated Dec. 17, 2013 in connection with U.S. Appl. No. 12/592,523, filed Nov. 25, 2009.
Response to Dec. 17, 2013 Final Office Action, filed Mar. 14, 2014, in connection with U.S. Appl. No. 12/592,523, filed Nov. 25, 2009.
Advisory Action dated Apr. 16, 2014 in connection with U.S. Appl. No. 12/592,523, filed Nov. 25, 2009.
Office Action dated Oct. 3, 2014 in connection with U.S. Appl. No. 12/592,523, filed Nov. 25, 2009.
Response to Oct. 3, 2014 Office Action, filed Dec. 30, 2014, in connection with U.S. Appl. No. 12/592,523, filed Nov. 25, 2009.
Notice of Allowance dated May 6, 2015 in connection with U.S. Appl. No. 12/592,523, filed Nov. 25, 2009.
Notice of Allowance dated Oct. 20, 2015 in connection with U.S. Appl. No. 12/592,523, filed Nov. 25, 2009.

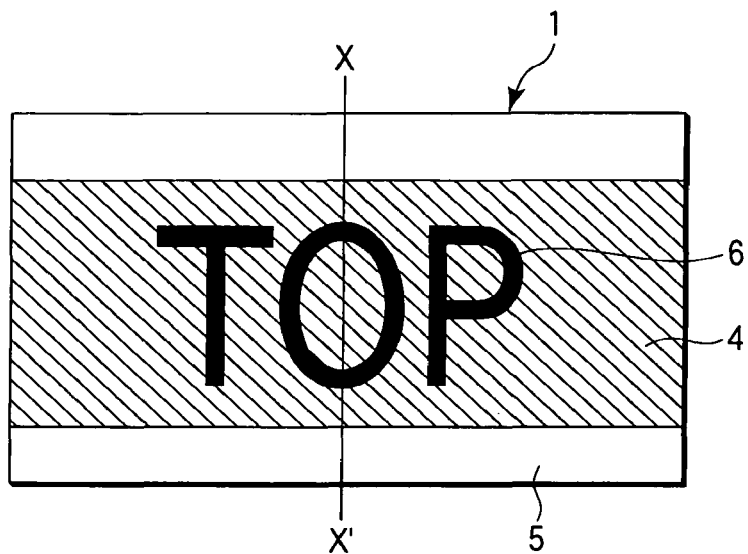
F I G. 1
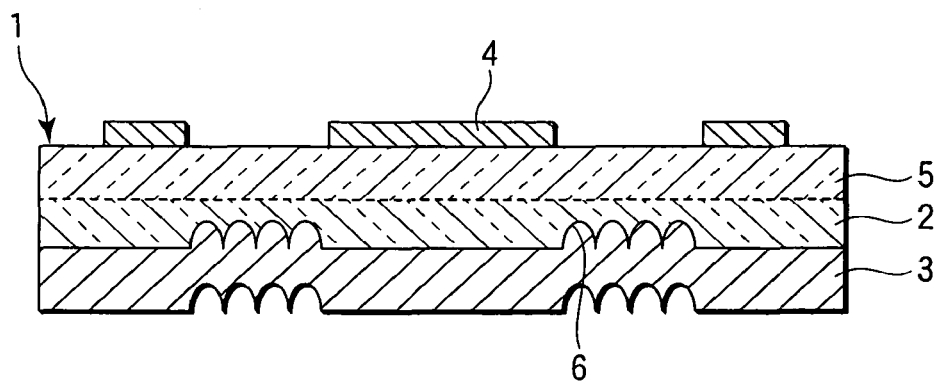
F I G. 2

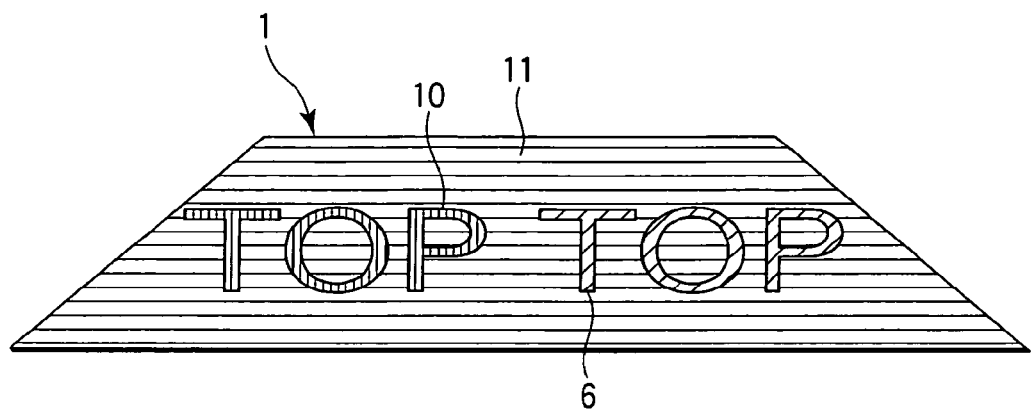
F I G. 11
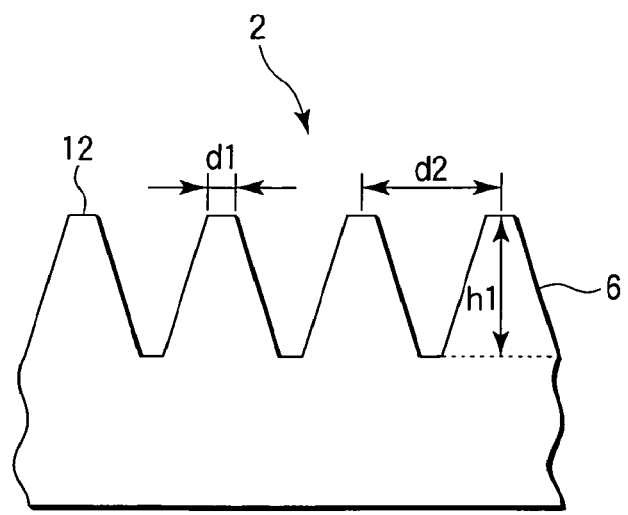
F I G. 12

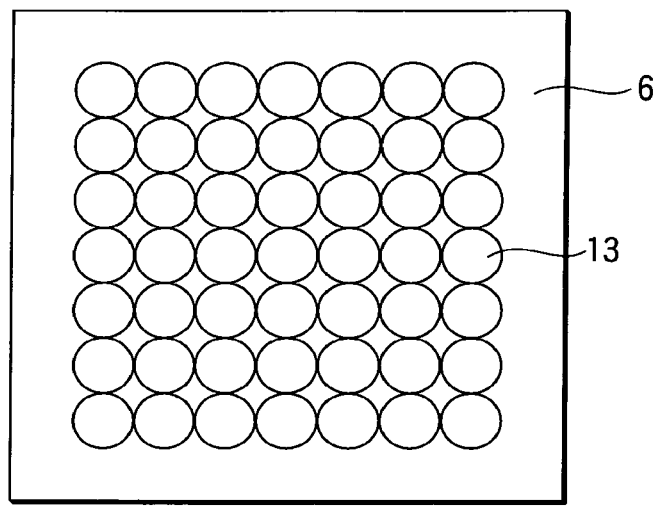
F I G. 13
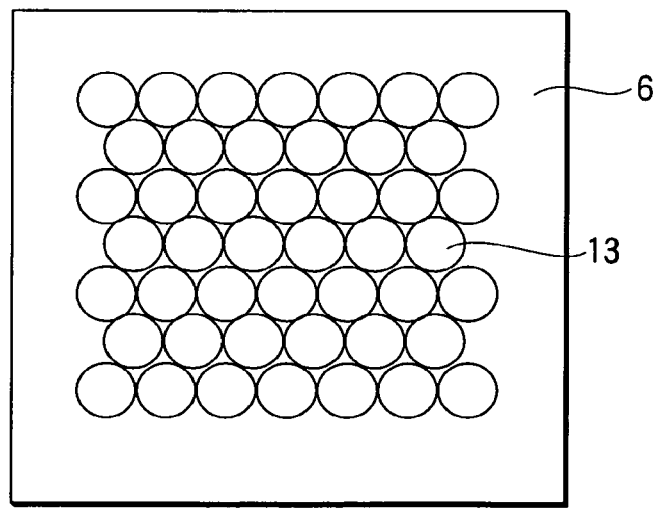
F I G. 14

DISPLAY AND INFORMATION-PRINTED MATTER

RELATED APPLICATIONS

This application is a continuation of U.S. Ser. No. 12/592,523, filed Nov. 25, 2009, now allowed, which is a Continuation Application of PCT International Application No. PCT/JP2007/072134, filed Nov. 14, 2007, which was published under PCT Article 21(2) in Japanese, which claims the priority of Japanese Patent Application Nos. 2007-152730, filed Jun. 8, 2007 and 2007-138808, filed May 25, 2007, the contents of each of which are hereby incorporated by reference into this application.

BACKGROUND OF THE INVENTION

1. Field of the Invention

The present invention relates to a forgery prevention technique.

2. Description of the Related Art

Authentication articles such as cash cards, credit cards and passports and securities such as gift certificates and stock certificates are desired to be difficult of forgery. For this reason, a label which is difficult of forgery or imitation and which makes it easy to distinguish a genuine article from a forged article or an imitated article has conventionally been attached to such an article in order to suppress the forgery.

Further, in recent years, circulation of forged articles is regarded as a problem also for articles other than the authentication articles and securities. For this reason, opportunities have been increasing to apply to such articles the forgery prevention technique mentioned for the authentication articles and the securities.

Patent document 1 describes a display in which multiple pixels are arranged. In this display, each pixel includes a relief-type diffraction grating in which grooves are arranged.

This display displays an image by utilizing diffracted light, and hence it is impossible to forge the display using the printing technique or electrophotographic technique. Accordingly, if this display is attached to an article as a label for authentication, seeing the image displayed on the label makes it possible to confirm that the article is genuine. Therefore, an article to which this label is attached is hardly forged as compared with an article to which this label is not attached.

The above-mentioned relief-type diffraction grating, however, can be formed with comparative ease if a device such as a laser is available. Further, in the above display, although a change in the display image is caused by changing an angle of incidence of the illumination light, an observation angle or an orientation of the display, the change is not so rich in variety. Therefore, with the development of the technology, the forgery prevention effect of this display is becoming lower. Incidentally, difficulty of forgery or imitation, or ease in distinction of a genuine article from a forged or imitated article is called here a forgery prevention effect.

Patent document 1: Jpn. Pat. Appln. KOKAI Publication No. 2-72320

BRIEF SUMMARY OF THE INVENTION

Problem to be Solved by Invention

An object of the present invention is to realize a higher forgery prevention effect.

Means for Solving Problem

According to a first aspect of the present invention, there is provided a display characterized by comprising a substrate with a light-transmitting property, a relief structure-forming layer disposed on at least one surface of the substrate and including a relief-structured region on a surface thereof opposite to its surface in contact with the substrate, a light-reflecting layer disposed on the surface of the relief structure-forming layer including the relief-structured region, and a printed layer formed on a surface of the substrate opposite to the surface on which the relief structure-forming layer is disposed, or between the relief structure-forming layer and the light-reflecting layer, or on a side of the light-reflecting layer opposite to its surface in contact with the relief structure-forming layer, wherein the relief-structured region is constituted by recessed or protruding portions arranged two-dimensionally, has low reflectivity and low diffusibility under a normal illumination condition, and exhibits a diffracted light-emitting property under a specific condition.

According to a second aspect of the present invention, there is provided an information-printed matter characterized by comprising the display according to the first aspect, and a printed matter substrate supporting it.

Advantageous Effect of Invention

According to the present invention, a higher forgery prevention effect can be realized.

DETAILED DESCRIPTION OF THE INVENTION

Embodiments of the present invention will be described below in detail with reference to the accompanying drawings. Incidentally, in the drawings, constituent elements exhibiting the same or similar function are denoted by the identical reference symbols, and a duplicate description will be omitted.

FIG. 1 is a plan view schematically showing a display according to a first embodiment of the present invention. FIG. 2 is a cross-sectional view of the display shown in FIG. 1 taken along the line X-X'.

This display 1 includes a layered product of a substrate 5 with a light-transmitting property, a relief structure-forming layer 2 disposed on one surface of the substrate 5 and including a relief-structured region 6 on a surface thereof opposite to its surface in contact with the substrate 5, a light-reflecting layer 3 disposed on the surface of the relief structure-forming layer 2 including the relief-structured region 6, and a printed layer 4 disposed on the other surface of the substrate 5. In the example shown in FIG. 2, the side on the printed layer 4 is the front side (observer's side), while the side on the light-reflecting layer 3 is the back side.

The substrate 5 with a light-transmitting property is a film or sheet made of a resin having a light-transmitting property such as polyethylene terephthalate (PET), polycarbonate (PC) or triacetylcellulose. As the material of the substrate 5, inorganic material such as glass may also be used. The substrate 5 may have a monolayer structure or multilayered structure. The substrate 5 may be subjected to a treatment such as antireflection treatment, low-reflection treatment, hard-coating treatment, antistatic treatment or soil-resistant treatment.

As the material of the relief structure-forming layer 2, for example, a resin having a light-transmitting property can be used. For example, in the case where a thermoplastic resin, a thermosetting resin or a photo-setting resin is used, the relief structure-forming layer 2 can be formed easily by a transfer using a master to have a surface including the relief-structured region 6 constituted by the recessed or protruding portions. The materials of the substrate 5 and the relief structure-forming layer 2 may be the same or different.

As the light-reflecting layer 3, for example, a metal layer made of a metal material such as aluminum, silver and an alloy thereof can be used. Alternatively, as the light-reflecting layer 3, a dielectric layer having a refractive index different from that of the relief structure-forming layer 2 may be used. Alternatively, as the light-reflecting layer 3, a layered product of dielectric layers in which adjacent dielectric layers have different refractive indices, i.e., multilayered dielectric film may be used. It is preferable that the dielectric layer of the multilayered dielectric film in contact with the relief structure-forming layer 2 has a refractive index different from the refractive index of the relief structure-forming layer 2.

The metal layer, the dielectric layer and the multilayered dielectric film can be formed using a thin-film formation technique such as evaporation or sputtering. Further, it is possible to spatially distribute the region in which the light-reflecting layer 3 is present so as to display a pattern using the distribution of the light-reflecting layer 3, for example, using the contours of the region in which the light-reflecting layer 3 is present.

The printed layer 4 displays an image such as pattern, character or symbol, and various inks such as offset inks, letterpress inks or gravure inks can be used depending on the method for printing the printed layer 4. The ink used for the printing can be classified based on a classification by composition such as resin-type ink, oil-based ink and water-based ink or a classification by drying process such as oxidative polymerization-type ink, penetration dry-type ink, evaporation dry-type ink and ultraviolet-curing ink, and is appropriately selected according to the type of the substrate and the printing method. Further, it is a commonly used technique for forming a printed layer that a toner obtained by attaching coloring particles such as graphite or pigment to plastic particles having a property of electrification is transferred onto a substrate such as paper by utilizing static electricity and then fixed by heating.

In FIG. 2, the printed layer 4 is depicted as a layer which is formed on the surface of the substrate 5 opposite to the surface provided with the relief structure-forming layer 2 and is the nearest with respect to an observer. The printed layer 4 may be formed between the relief structure-forming layer 2 and the light-reflecting layer 3 or on the side of the light-reflecting layer 3 opposite to the surface in contact with the relief structure-forming layer 2.

FIGS. 3 and 4 are sectional views each showing, in an enlarging manner, an example of a display structure that can be employed in the present invention.

As in the sectional view shown in FIG. 3, in the case where the printed layer 4 is placed between the relief structure-forming layer 2 and the light-reflecting layer 3, it is preferable that the printed layer 4 is formed using a material having a refractive index close to that of the material of the relief structure-forming layer 2. This makes the recessed or protruding portions in the relief-structured region 6 flattened at the position where the printed layer 4 is formed, and it is thus visually perceived as if the recessed or protruding portions are absent. Accordingly, if a solid plate having the relief-structured region 6 on the entire surface of the substrate 5 is formed, even in the case of a small-volume production, etc., a display having a pattern can be easily manufactured by forming the printed layer 4 between the relief structure-forming layer 2 (the solid plate) and the light-reflecting layer 3 without using a master for forming the display 1.

As in the sectional view shown in FIG. 4, in the case where the printed layer 4 is provided on the side of the light-reflecting layer 3 opposite to the surface in contact with the relief structure-forming layer 2, it is necessary to bring about such a state that an observer can observe, for example, by providing the light-reflecting layer 3 not entirely but partially on the surface.

The display 1 may be further provided with the adhesive layer 7 on the side of the light-reflecting layer 3 opposite to its surface in contact with the relief structure-forming layer 2. When the adhesive layer 7 is provided, the surface of the light-reflecting layer 3 is not exposed, and thus replication of the recessed or protruding portions is difficult even in the case where the surface shape of the light-reflecting layer 3 is almost the same as the shape of the interface between the relief structure-forming layer 2 and the light-reflecting layer 3. In the case where the side of the relief structure-forming layer 2 is the back side, while the side of the light-reflecting layer 3 is the front (observation) side, the adhesive layer is formed on the relief structure layer 2. In this case, the relief-structured region is included not in the interface between the relief structure layer 2 and the light-reflecting layer 3 but in the interface between the light-reflecting layer 3 and the external environment.

FIG. 5 is a perspective view showing, in an enlarging manner, an example of a structure that can be employed in the relief-structured region 6 of the display shown in FIGS. 1 and 2.

The relief-structured region 6 shown in FIG. 5 is provided with the protruding portions 8. Although the relief-structured region 6 is constituted only by the protruding portions 8 here, this is merely an example. In the present invention, the relief-structured region 6 can be formed using recessed portions.

Next, the special visual effect of the display 1 originated from the relief structure-forming layer 2 be described.

In the case where center-to-center distances of the adjacent recessed or protruding portions of the relief structure-forming layer (relief-structured region 6) have a constant periodicity as shown in FIG. 5, when the relief structure-forming layer is illuminated, the relief structure-forming layer emits diffracted light in a specific direction with respect to the direction of illumination light as incident light.

1st-order diffracted light is the most representative diffracted light. An angle of emergence β of 1st-order diffracted light can be calculated using the following equation (1).

$$d = m\lambda/(\sin \alpha - \sin \beta) \quad (1)$$

In this formula (1), d represents a center-to-center distance of the recessed or protruding portions, and λ represents a wavelength of the incident light and the diffracted light. Further, α represents the angle of emergence of the 0-order diffracted light, i.e., the transmitted light or the regular reflected light.

As is evident from the formula (1), the angle of emergence β of the 1st-order diffracted light changes according to the wavelength λ. That is, the relief structure-forming layer has a function as a spectroscope. Accordingly, in the case where the illumination light is white light, when the observation angle for the relief structure-forming layer is changed, the color perceived by the observer will be changed.

Further, the color perceived by the observer under a certain observation condition changes according to the grating constant d. As an example, it is assumed that the relief structure-forming layer emits 1st-order diffracted light in the normal direction thereof. That is, it is assumed that the angle of emergence β of the 1st-order diffracted light is 0°. Further, it is assumed that the observer perceives this 1st-order diffracted light. When it is assumed that the angle of emergence of the 0-order diffracted light at this time is $\alpha_N$, the formula (1) can be simplified to the following formula (2).

$$d = \lambda / \sin \alpha_N \quad (2)$$

As is evident from the formula (2), in order to allow the observer to perceive a specific color, it suffices that a wavelength λ corresponding to the color, an incident angle $|\alpha_N|$ of the illumination light, and a center-to-center distance d are set to satisfy the relationship shown by the formula (2).

In the present invention, the relief-structured region is constituted by the recessed or protruding portions arranged two-dimensionally, has low reflectivity and low diffusibility under a normal illumination condition, and exhibits a diffracted light-emitting property under a specific condition. Since the relief-structured region has low reflectivity and low diffusibility under the normal illumination condition, a color with low degrees of lightness and chromaticness such as black and dark gray is perceived under the normal illumination condition. On the other hand, since it has the diffracted light-emitting property under the specific condition, it has the diffracted light-emitting property when observed under the specific condition.

Here, "normal illumination condition" refers to a condition in which light from illumination light enters a surface of a substrate almost perpendicularly under illumination light, for example, that from a fluorescent lamp and an observer visually observes the display in an ordinary indoor environment, or a condition in which light from illumination light enters a surface of a substrate almost perpendicularly under illumination light such as sunlight and an observer visually observes the display in an outdoor environment. Here, "normal illumination light" refers to the illumination light in the normal illumination condition.

On the other hand, "specific condition" means a condition in which light from illumination light enters a surface of a display almost horizontally, i.e., at an acute angle, and an observer visually observes the display.

Thus, when the display is observed in the normal direction thereof, the relief structure-forming layer is seen black. Here, "black" means that the reflectance for any of the light components within a wavelength range of 400 nm to 700 nm is 25% or less when the display 1 is irradiated with light from the normal direction and the intensity of the regular reflected light is measured. Thus, the relief structure-forming layer is seen as if it is a black printed layer. Dark gray with low degrees of lightness and chroma is perceived when the reflectance is about 25% or less, while a sufficient antireflection effect is achieved and thus black is perceived when the reflectance is 10% or less, although it varies depending on the environment of observation and individual differences.

In the case where the angle of emergence of the 1st-order diffracted light from the relief structure-forming layer falls within a range of −90° to 90°, if the angle formed by the normal to the display and the observation direction is set appropriately, the observer can perceive the 1st-order diffracted light from the relief structure-forming layer. Thus, in this case, it is possible to check with eyes that the relief structure-forming layer is different from a black printed layer.

That is, the relief structure-forming layer including the relief-structured region can greatly decrease the reflectance for regular reflected light with respect to incident light and can allow visible light to be emitted as reflection-diffracted light by the periodicity of the arrangement of the recessed or protruding portions in a specific direction depending on the incident angle of the incident light. In contrast, the printed layer 4 formed using ink or toner exhibits a color, i.e., hue, lightness and chroma unique to the ink or toner, and the incident angle of the incident light does not greatly changes the color. Therefore, under most observation conditions, the relief structure-forming layer is seen black while the normal reflected light from the printed layer can be observed, and hence a high-contrast image can be displayed.

On the other hand, since diffracted light can be observed under the aforementioned condition in which the 1st-order diffracted light can be observed, it is possible to impart a unique visual effect that an image seen black under a normal condition is suddenly seen lucently when changing the observation angle.

Therefore, when it is used in an information-printed matter for forgery prevention including the display and a printed matter substrate supporting this, a high forgery prevention effect can be achieved.

In the display, the relief-structured region coexists with the region in which the printed layer is formed. Both display images which an observer perceives. Under the normal illumination condition, the relief-structured region displays an image of black or dark gray, while the region of the printed layer displays an image of a color, i.e., hue, lightness and chroma unique to the ink or toner. When the observation condition is changed, for example, by inclining display, diffracted light is perceived for the relief-structured region, while the same color as that under the normal illumination condition is perceived for the printed layer, and thus a difference in vision appears clearly.

Such an effect cannot be achieved only by a printed layer and cannot be achieved even by a combination of a printed layer and a diffraction grating pattern. Since the aforementioned effect is achieved by the combination of the relief structure-forming layer including the relief-structured region and the printed layer, a visual effect that cannot be achieved by conventional displays is produced, and thus it becomes possible to obtain the forgery prevention effect.

As the ink or toner for forming the printed layer, the one exhibiting low reflectivity and low diffusibility for a predetermined illumination light is used preferably. In other words, it is preferable that the color of the ink or toner has almost the same hue, lightness and chroma as that of the black or dark gray displayed by the relief structure-forming layer including the relief-structured region. This makes it difficult to discern the difference of constructions because almost the same color is perceived for them under the normal illumination condition. Further in the case where the observation condition is changed, for example, by inclining the display, the difference of constructions can be discerned because the relief structure-forming layer emitting diffracted light exhibits a visual effect different from that of the printed layer.

For example, it is possible to impart the effect that under the normal illumination condition, the region 9 painted over in solid black is perceived as merely a rectangle as shown in FIG. 6, while under a specific condition, for example, under a condition that the display 1 is inclined, the rectangular region 9 is divided into a character portion displayed by the relief structure-forming layer including the relief-structured region 6 and a portion surrounded by the character portion and displayed by the printed layer, and thus the information that cannot be recognized under the normal illumination condition can be obtained.

As the ink for printing, a functional ink capable of changing its color according to the observation angle can be used. Examples of the functional ink capable of changing its color according to the observation angle include so-called optical variable inks, color shift inks and pearl inks.

The optical variable inks and the color shift inks have a function of color change, for example, from red to green or from blue to violet according to the observation angle, while the pearl inks have a function of displaying light pearl-like color at a specific angle. When such a functional ink is used, both the relief structure-forming layer and the printed layer can exhibit color change according to the observation angle. In the case where multiple regions of the display employ such a structure that causes color change, even for a person unaccustomed to a procedure of descriminating between a genuine article and a non-genuine article by inclining the display, the color change can be perceived easily, and thus the descrimination between a genuine article and a non-genuine article can be performed with reliability. Particularly, when the angle at which the color change due to the functional ink occurs and the angle at which the color change due to the relief structure-forming layer occurs are almost equal to each other, both color changes can be observed simultaneously, and thus the descrimination between a genuine article and a non-genuine article can be performed with a higher degree of reliability.

Since the relief structure-forming layer including the relief-structured region according to the present invention has a function of switching between a black or dark gray display and a display utilizing color of diffracted light depending on the observation angle, when a functional ink exhibiting the color change is used as the ink for forming the printed layer, both the relief structure-forming layer and the printed layer can exhibit color change according to the observation angle, and thus a higher forgery prevention effect can be obtained.

Particularly, when the angle at which the change between the black or dark gray display by the relief structure-forming layer including the relief-structured region and the display utilizing color of diffracted light occurs is made equal to the angle at which the color of the functional ink changes, both change can be perceived simultaneously, thus a higher forgery prevention effect can be achieved as compared with a display in which only one of them is present, and the descrimination between a genuine article and a non-genuine article can be performed with a higher degree of reliability. In this case, under the normal illumination condition, the character portion displayed by the relief structure-forming layer (relief-structured region 6) and the character portion displayed by the printed layer 4 are perceived as different colors as shown in FIG. 8, while under the specific condition, for example, under a condition that the display 1 is inclined, each of the character portion displayed by the relief structure-forming layer (relief-structured region 6) and the character portion displayed by the printed layer 4 changes to a different color.

As a printing technique exerting a forgery prevention effect, a latent image pattern is known. A display image of the latent image pattern cannot be recognized under a normal illumination condition, and the concealed display image becomes recognizable, for example, when a display is inclined at a predetermined angle.

As the construction of the latent image pattern, generally employed is the construction in which the concealed image 10 and the peripheral portion 11 are constituted by fine lines intersecting at right angles as shown in FIG. 10. The pitch of the fine lines is about 3 to 10 lines per 1 mm. The image constituted as such is hard to distinguish the vertical lines and the horizontal lines intersecting at right angles under the normal illumination condition, thus is difficult of recognizing the image (in FIG. 10, the pitch of the fine lines are depicted greater than that of the actual one, and thus the image is recognizable).

When such a latent image pattern is observed in a state inclined at a predetermined angle, the vertical lines of the concealed image 10 and the horizontal lines of the peripheral portion 11 are seen to have different pitches. This difference allows an observer to perceive the concealed image.

Since the relief structure-forming layer according to the embodiment of the present invention has a function of switching between a black or dark gray display and a display and a display utilizing color of diffracted light depending on the observation angle, when a latent image pattern is formed by the printed layer, the color change according to the observation angle and the change of the displayed image according to the observation angle caused by the latent image pattern can be mutually compatible, and thus a higher forgery prevention effect can be obtained.

Particularly, when the angle and the direction at which the change between the black or dark gray display by the relief structure-forming layer including the relief-structured region and the display utilizing color of diffracted light occurs are made equal to the angle and the direction at which the concealed image by the latent image pattern appears, both changes can be observed simultaneously, a higher forgery prevention effect can be achieved as compared with the display in which only one of them is present, and the descrimination between a genuine article and a non-genuine article can be performed with a higher degree of reliability. In this case, under the normal illumination condition, the latent image pattern (concealed image 10) cannot be recognized as shown in FIG. 10; and when the observation angle is changed, the latent image pattern (concealed image 10) appears as shown in FIG. 11 and the diffracted light from the relief structure-forming layer including the relief-structured region can be observed.

It is preferable that a surface area of the single recessed or protruding portion is equal to or greater than 1.5 times an occupied area necessary for placing the single recessed or protruding portion on the surface of the relief structure-forming layer. When the surface area of the single recessed or protruding portion is equal to or greater than 1.5 times the occupied area, excellent low-reflectivity and low-diffusibility can be obtained. That is, black is recognized when observed visually. On the other hand, the case where the surface area of the single recessed or protruding portion is less than 1.5 times the occupied area is not preferable because the reflectance is high similar to the properties of a flat surface.

As the method of shaping the recessed or protruding portions formed on the relief structure-forming layer, various methods such as radiation cure molding, extrusion molding and heat press molding can be utilized. Examples of a shape that can be employed for the recessed or protruding portions formed on the relief structure-forming layer include a circular cone shape, a pyramid shape, an elliptic cone shape, a cylindrical column or circular cylinder shape, a prism or rectangular cylinder shape, a truncated circular cone shape, a truncated prism shape, a truncated elliptic cone shape, a shape obtained by joining a cylindrical column or circular cylinder and a circular cone together, a shape obtained by joining a prism or rectangular cylinder and a pyramid together, a semi-sphere shape, a semi-ellipse shape, a bullet shape and a bowl shape.

Particularly, it is preferable that the cross sections of the recessed or protruding portions formed on the relief structure-forming layer have a tapered shape. When the cross sections of the recessed or protruding portions have a tapered shape, the property of demolding a resin from a stamper made of metal is excellent, and thus a high degree of mass productivity can be achieved. Further, in the case where the cross sections of the recessed or protruding portions have a tapered shape, higher degrees of low-reflectivity and low-diffusibility can be achieved as compared with the case where the cross sections of the recessed or protruding portions have a rectangular shape.

Here, a tapered shape refers to the case where a recessed or protruding portion is formed such that a cross-sectional area thereof parallel with a surface of a substrate decreases from the base end toward the tip.

FIG. 12 is an enlarged cross-sectional view of a relief structure-forming layer 2 (relief-structured region 6) in which the recessed or protruding portions have a truncated shape.

Generally, in the case where the recessed or protruding portions have one of a truncated circular cone shape, a truncated pyramid shape and a truncated elliptic cone shape, the flat surfaces 12 on the truncated tops of the recessed or protruding portions increase the regular reflectance. However, when the width d1 of the flat surfaces 12 is set 90 nm or less, the regular reflected component caused by the flat surfaces can be decreased sufficiently, and thus black can be displayed on the relief structure-forming layer. That is, black can be displayed at almost the same degree as in the case where the width d1 of the flat surfaces is 0 nm. Further, in the case where the width 12 of the flat surfaces is 90 nm or less, if some errors occur in processing accuracy, the relief-structured region can be obtained to have desired optical properties, and thus processing such as electron bean drawing and etching and a volume production can be performed easily.

FIGS. 13 and 14 are plan views each schematically showing an example of an arrangement pattern of the recessed or protruding portions that can be employed in the relief structure-forming layer (relief-structured region 6).

In the relief structure-forming layer (relief-structured region 6) shown in FIG. 13, the recessed or protruding portions 13 are arranged in a matrix form at a predetermined center-to-center distance. This structure is comparatively easy to manufacture using a fine processing apparatus such as an electron beam drawing apparatus or a stepper and also comparatively easy to precisely control the center-to-center distance of the recessed or protruding portions, etc.

In addition, in the structure of FIG. 13, the recessed or protruding portions are arranged regularly. Accordingly, when the center-to-center distance of the recessed or protruding portions 13 is set 200 nm or more, it is possible to allow the relief-structured region 6 to emit diffracted light. In this case, it is possible to visually confirm that the relief-structured region 6 is different from a black printed layer.

Further, when the center-to-center distance of the recessed or protruding portions 13 is set less than 200 nm, emission of diffracted light from the relief-structured region 6 can be prevented. In this case, in terms of the observed color, it becomes difficult to visually confirm that the relief-structured region 6 is different from a black printed layer.

In the relief structure-forming layer (relief-structured region 6) shown in FIG. 14, the recessed or protruding portions 13 are arranged in a honeycomb form at a predetermined center-to-center distance. This structure can make the area occupied by the recessed or protruding portions 13 small, and thus reflection of light can be prevented more efficiently.

It should be noted that in the present invention, the arrangement pattern of the recessed or protruding portions is not limited to the above described matrix or honeycomb form. It may be an arrangement pattern having other periodicities such as a rectangular lattice.

When the center-to-center distance of the adjacent recessed or protruding portions of the relief structure-forming layer including the relief-structured region is 400 nm or less, it is possible to prevent any diffracted light within a wavelength range of 400 to 700 nm, which is the visible light range, from being emitted in the normal direction regardless of the incident angle of the illumination light. According to the equation (2), the light of 400 nm is barely able to travel in the normal direction when illuminated at 89°. Thus, under any illumination condition, the recessed or protruding portions cannot emit diffracted light toward the front at sufficient intensity within substantially the whole visible range of wavelength. That is, diffracted light is emitted at an angle greatly different from the normal direction, and thus diffracted light can be observed only when it is greatly inclined with respect to the normal direction.

Here, the center-to-center distance means the distance d2 between the central axes of the adjacent recessed or protruding portions shown in FIG. 12.

When the center-to-center distance of the recessed or protruding portions is 250 nm or more and 300 nm or less, as for the visible wavelength range of 400 to 700 nm, diffracted light corresponding to at least the red component cannot be observed on the relief structure-forming layer. That is, although the relief structure-forming layer does not emit diffracted light in the direction normal to the display and emits diffracted light at an angle greatly different from the normal direction similar to the case where the center-to-center distance is 400 nm or less, no diffraction occurs at the visible light wavelength corresponding to red and diffraction occurs only at the visible light wavelength corresponding to blue and green, and thus it is possible to display only the color that does not change between the rainbow colors as a conventional hologram but is similar to blue and green.

Preferably, the height of the recessed or protruding portions in the direction perpendicular to the surface of the substrate is 200 nm or more and 600 nm or less. In the case where the height is less than 200 nm, the reflectance increases as the properties of a flat surface, and thus it is impossible to impart sufficient low-reflectivity and low-diffusibility. In the case where the height is more than 600 nm, replicating the relief structure-forming layer is difficult.

Here, the height of the recessed or protruding portions means the height h1 of the recessed or protruding portions shown in FIG. 12.

The relief structure-forming layer including the relief-structured region can make the recessed or protruding portions give different phase retardations to P-polarized light and S-polarized light, and thus is possible to exhibit a polarizing property. When the diffracted light emitted by the relief structure-forming layer having a polarizing property is observed through a polarizing plate, it is possible to see that switching between a state where diffracted light is visible and a state where no diffracted light is visible occurs according to the polarizing direction of the polarizing plate. The polarizing property of the relief structure-forming layer allows the descrimination between a genuine article and a non-genuine article using a polarizing plate, and thus the forgery prevention effect is further enhanced.

The relief structure-forming layer may be provided with a diffraction grating pattern region adjacent to the relief-structured region. When the diffraction grating pattern region is provided, a higher forgery prevention effect can be obtained. A diffraction grating pattern display which is used with and adhered to a security emits diffracted light due to a light-reflecting layer made of, for example, aluminum and a diffraction grating structure, and thus has an effect of iridescence. Under such an observation condition that no diffracted light is emitted toward the observer, only a metallic luster (for example, gold or silver) of the light-reflecting layer is perceived. Since the display including the relief-structured region and the diffraction grating pattern region can display black or dark gray that a conventional diffraction grating pattern display cannot display, a visual effect different from that of a conventional diffraction pattern display can be obtained.

In addition, since the relief-structured region and the diffraction grating pattern region are relief structure having a concavo-convex cross section, it is possible to provide a single master with both structures so as to form the relief structure-forming layer including the relief-structured region and the diffraction grating pattern region on the substrate in a single step.

FIG. 15 is a plan view schematically showing an example of an information-printed matter 100 including the display 1 according to the present invention.

Although an IC (integrated circuit) card is illustrated here as an information-printed matter, the information-printed matter including the display 1 is not limited to this. For example, the information printed matter including the display 1 may be other cards such as a wireless card, a magnetic card, an ID (identification) card, and the like.

In the IC card (information-printed matter 100) shown in FIG. 15, multiple forgery prevention measures including a function of the display 1 which allows for visual verification of genuineness and a function of the IC 20 in which encrypted information is recorded and which allows for non-visual verification of genuineness, and thus the forgery prevention performance of the information-printed matter is enhanced.

Further, the information-printed matter 100 includes a second printed layer 30 in addition to the display 1, and visual comparison between the second printed layer 30 and the display 1 is easy. Therefore, an article whose genuineness is uncertain can be easily descriminated between a genuine article and a non-genuine article as compared with the case where the information-printed matter 100 does not include the second printed layer 30.

That is, although it is preferable that the second printed layer 30 has the same function as that of the printed layer according to the present invention, the printed layer used in the display 1 and the second printed layer 30 do not necessarily require the same function.

The information-printed matter including the display 1 may be a security such as a gift certificate, a stock certificate and a check. Alternatively, the information-printed matter 100 including the display 1 may be a tag to be attached to an article, which is to be confirmed as a genuine article.

Alternatively, the information-printed matter 100 including the display 1 may be a package or a part thereof for accommodating an article to be confirmed as a genuine article.

Although in the printed matter 100 (IC card) shown in FIG. 15, the display 1 is adhered to the printed matter substrate 50, the display 1 can be supported by the substrate by other methods. For example, when paper is used as the printed matter substrate 50, the display 1 may be embedded in the paper, and the paper may be opened at a position corresponding to the display 1.

The display 1 may be used for a purpose other than forgery prevention. For example, the display 1 can also be utilized as a toy, a learning material, a decorative article, etc.

BRIEF DESCRIPTION OF THE SEVERAL VIEWS OF THE DRAWING

FIG. 1 is a plan view schematically showing a display according to a first embodiment of the present invention;

FIG. 2 is a cross-sectional view of the display shown in FIG. 1 taken along the line X-X';

FIG. 11 is a conceptional view showing a state where the display according to the embodiment of the present invention, which has the printed layer forming the latent image pattern and the relief structure-forming layer, is observed under the specific illumination condition;

FIG. 12 is an enlarged sectional view of a relief-structure-forming layer (relief-structured region) including recessed or protruding portions having a truncated shape;

FIG. 13 is a plan view schematically showing an example of an arrangement pattern of recessed or protruding portions or both of them that can be employed in the relief structure-forming layer (relief-structured region);

FIG. 14 is a plan view schematically showing another example of an arrangement pattern of recessed or protruding portions or both of them that can be employed in the relief structure-forming layer (relief-structured region)

NOTES ON REFERENCE SYMBOLS

Figure 3:
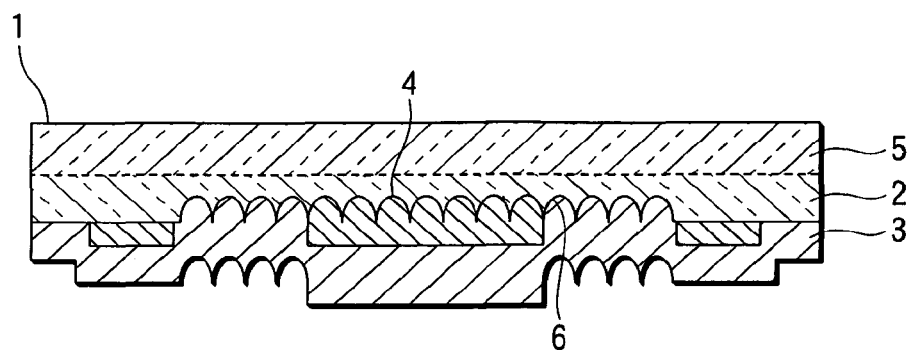
FIG. 3 is a sectional view showing, in an enlarging manner, an example of a structure that can be employed in the display shown in FIG. 1.
Figure 4:
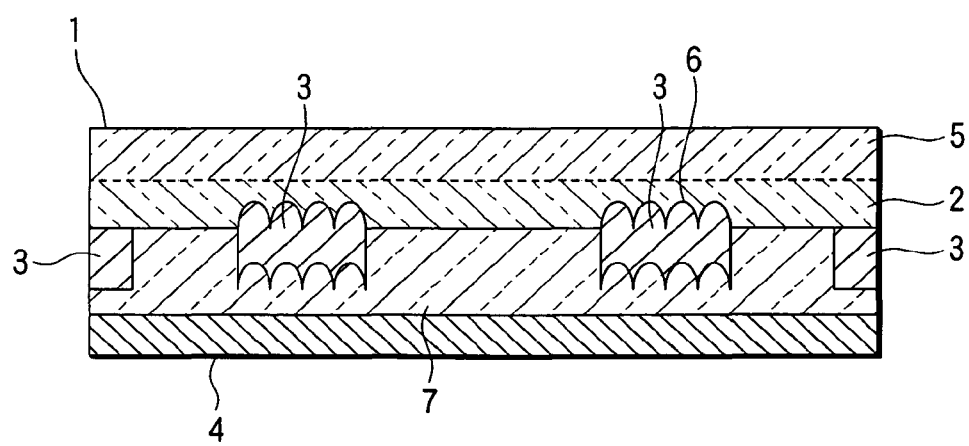
FIG. 4 is a sectional view showing, in an enlarging manner, another example of a structure that can be employed in the display shown in FIG. 1.
Figure 5:
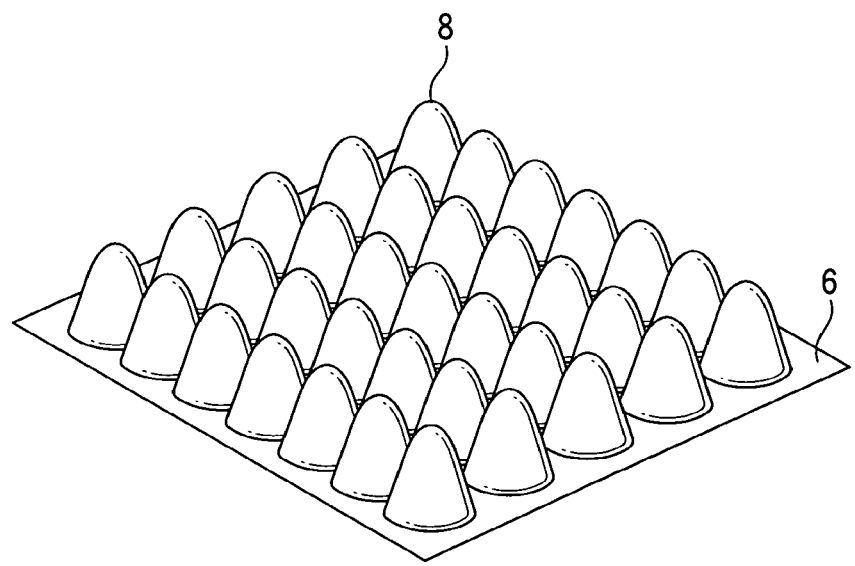
FIG. 5 is a perspective view showing, in enlarging manner, an example of a structure that can be employed in the relief-structured region according to the present invention.
Figure 6:
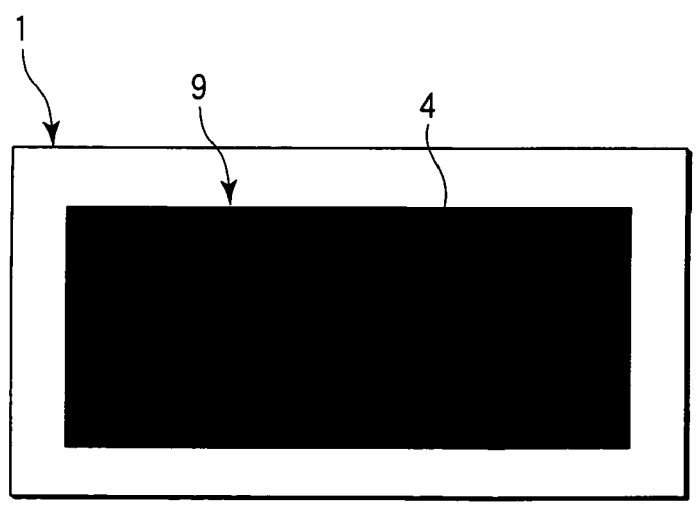
FIG. 6 is a conceptional view showing a state where a display according to an embodiment of the present invention, which has a printed layer and a relief structure-forming layer perceived as almost the same color, is observed under a normal illumination condition.
Figure 7:
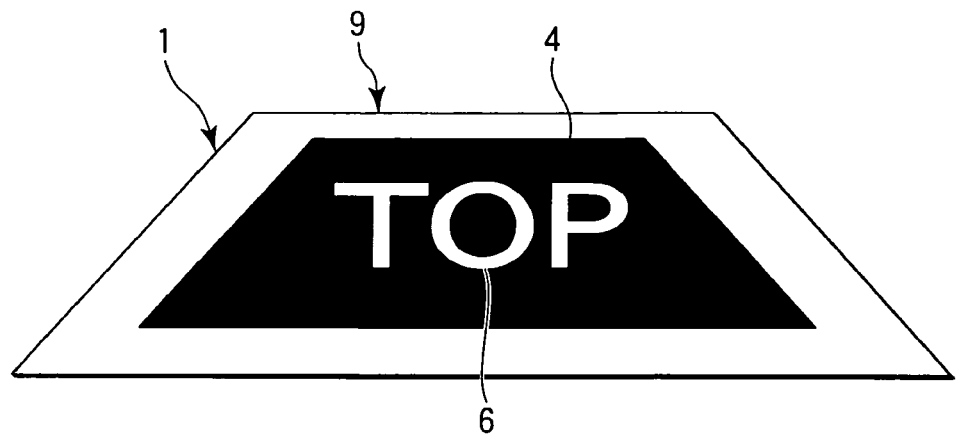
FIG. 7 is a conceptional view showing a state where the display according to the embodiment of the present invention, which has the printed layer and the relief structure-forming layer perceived as almost the same color, is observed under a specific illumination condition.
Figure 8:
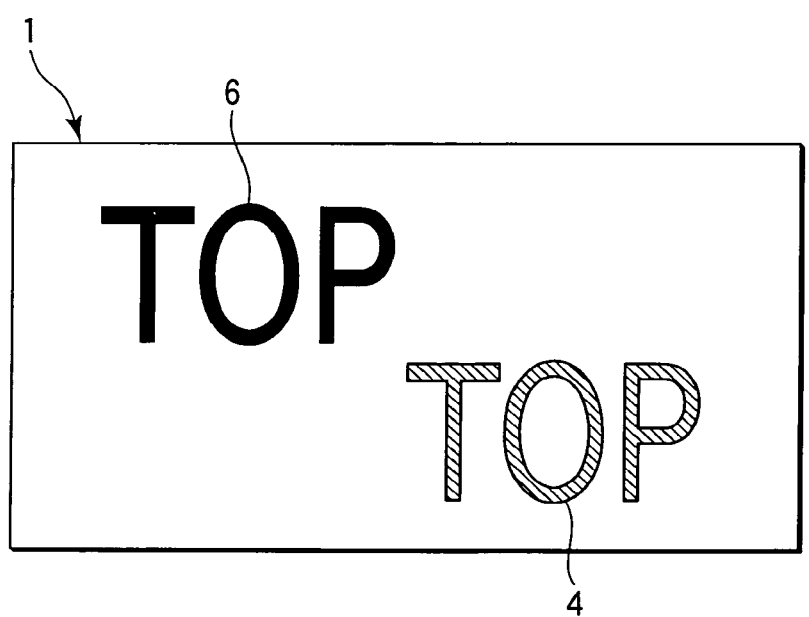
FIG. 8 is a conceptional view showing a state where a display according to an embodiment of the present invention, which has a printed layer formed from a functional ink and a relief structure-forming layer, is observed under the normal illumination condition.
Figure 9:
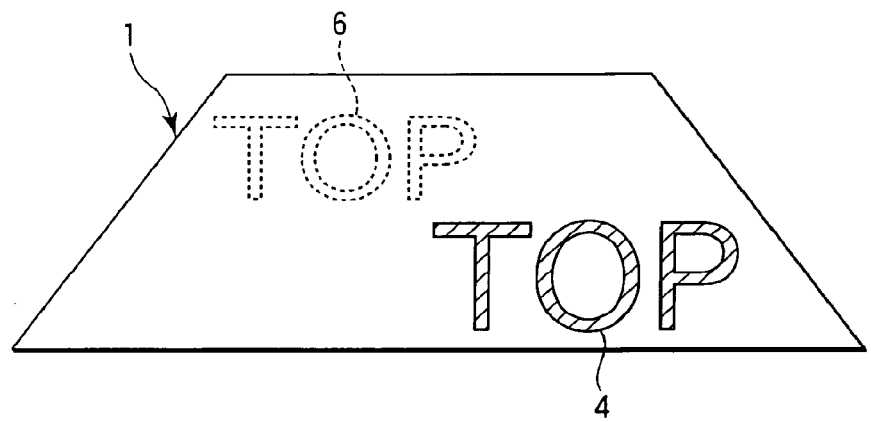
FIG. 9 is a conceptional view showing a state where the display according to the embodiment of the present invention, which has a printed layer formed from the functional ink and the relief structure-forming layer, is observed under the specific illumination condition.
Figure 10:
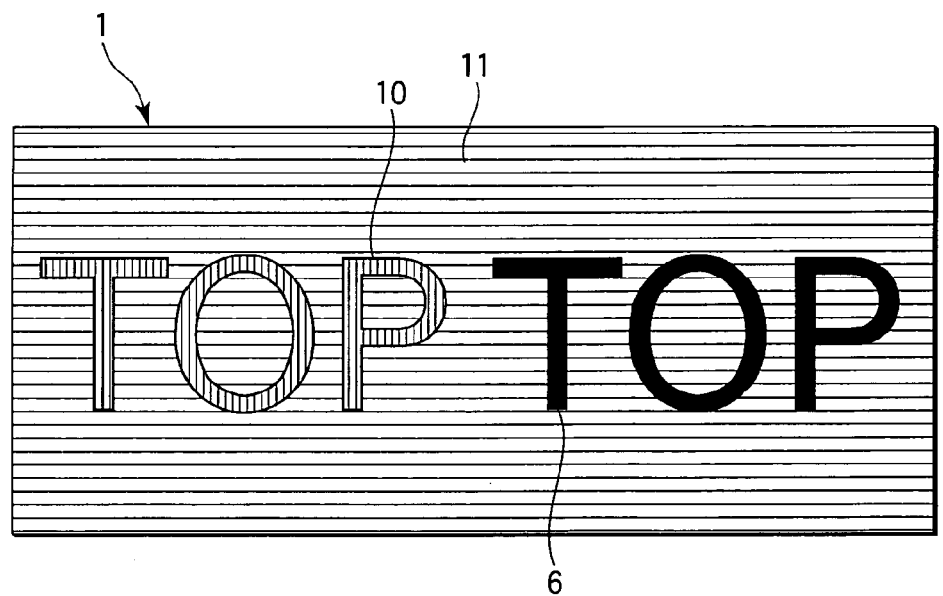
FIG. 10 is a conceptional view showing a state where a display according to an embodiment of the present invention, which has a printed layer forming a latent image pattern and a relief structure-forming layer, is observed under the normal illumination condition.
Figure 15:
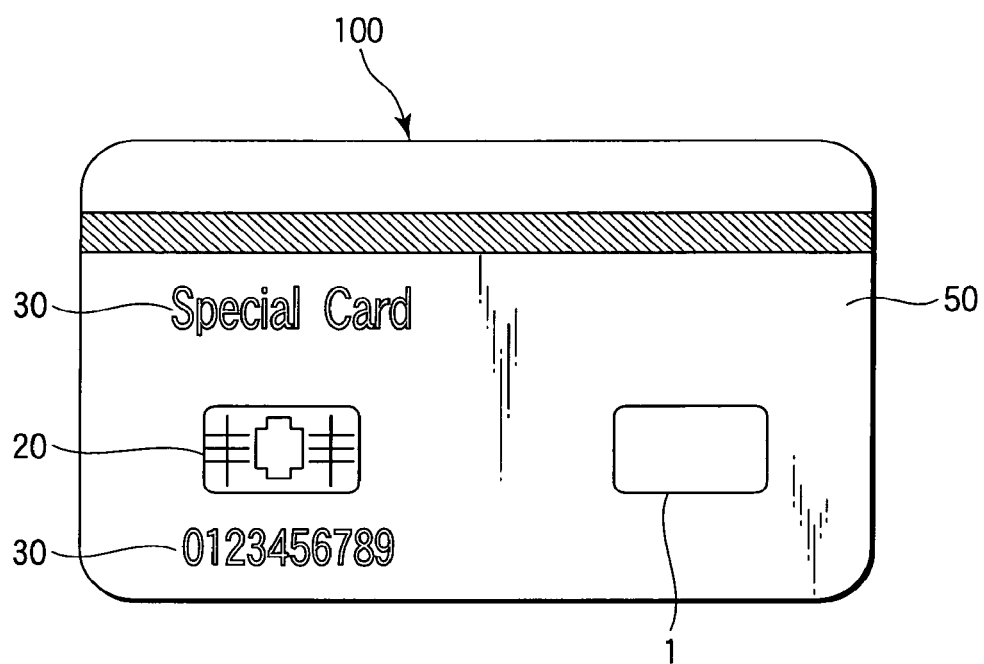
FIG. 15 is an illustration schematically showing an example of an information-printed matter (IC card) including the display according to the embodiment of the present invention.

1 . . . display, 2 . . . relief structure-forming layer, 3 . . . light-reflecting layer, 4 . . . printed layer, 5 . . . substrate, 6 . . . relief-structured region, 7 . . . adhesive layer, 8 . . . protruding portion, 9 . . . rectangular region, 10 . . . concealed image, 11 . . . peripheral portion of concealed image, 12 . . . flat surface, 13 . . . recessed or protruding portion, 20 . . . IC, 30 . . . second printed layer, 50 . . . printed matter substrate, 100 . . . information-printed matter.

What is claimed is:

1. A display comprising:
a substrate with a light-transmitting property, said substrate having a first surface and a second surface opposite to each other;
a relief structure-forming layer having a first surface and a second surface opposite to each other and disposed relative to the substrate such that the first surface of the relief structure-forming layer faces the first surface of the substrate, the second surface of the relief structure-forming layer including a relief-structured region, the relief-structured region including recessed or protruding portions arranged with constant periodicity in first and second directions crossing each other;
a light-reflecting layer disposed at least partially on the second surface of the relief structure-forming layer and at least partially covering the relief-structured region; and
a printed layer disposed at one of first to third positions, the first position being at a side of the substrate opposite the relief structure-forming layer, the second position being between the relief structure-forming layer and the light-reflecting layer, and the third position being at a side of the light-reflecting layer opposite the relief structure-forming layer,
wherein a center-to-center distance of the recessed or protruding portions and a height or depth of the recessed or protruding portions are configured such that the display displays black or dark gray at a position corresponding to a portion of the relief-structured region covered with the light-reflecting layer when the display is observed perpendicularly while irradiating the display with light in a direction perpendicular to the first surface of the substrate and such that the display displays colors of diffracted light when irradiated with light at an acute angle,
wherein the center-to-center distance of the recessed or protruding portions is 400 nm or less, and
wherein the height or depth of the recessed or protruding portions is 200 nm or more and 600 nm or less.

2. The display according to claim 1, wherein at least a part of the printed layer is provided with a latent image pattern that causes a change of a displayed image according to an observation angle.

3. The display according to claim 1, wherein a surface area of the single recessed or protruding portion is equal to or greater than 1.5 times an occupied area necessary for placing the single recessed or protruding portion on the surface of the relief structure-forming layer.

4. The display according to claim 1, wherein a section of the recessed or protruding portion has a tapered shape.

5. The display according to claim 1, wherein the recessed or protruding portion has one of truncated cone shape, truncated prism shape and truncated elliptic cone shape, a truncated top of the recessed or protruding portion has a flat surface parallel with the surface of the substrate, and a width of the flat surface is 90 nm or less.

6. The display according to claim 1, wherein the recessed portions or protruding portion are arranged in a matrix form at a predetermined center-to-center distance.

7. The display according to claim 1, wherein the recessed or protruding portions are arranged in a honeycomb form at a predetermined center-to-center distance.

8. The display according to claim 1, wherein the center-to-center distance of the recessed or protruding portions is 250 nm or more and 300 nm or less.

9. An information-printed matter comprising:
the display according to claim 1; and
a printed matter substrate supporting the display.

* * * * *